UNITED STATES PATENT OFFICE.

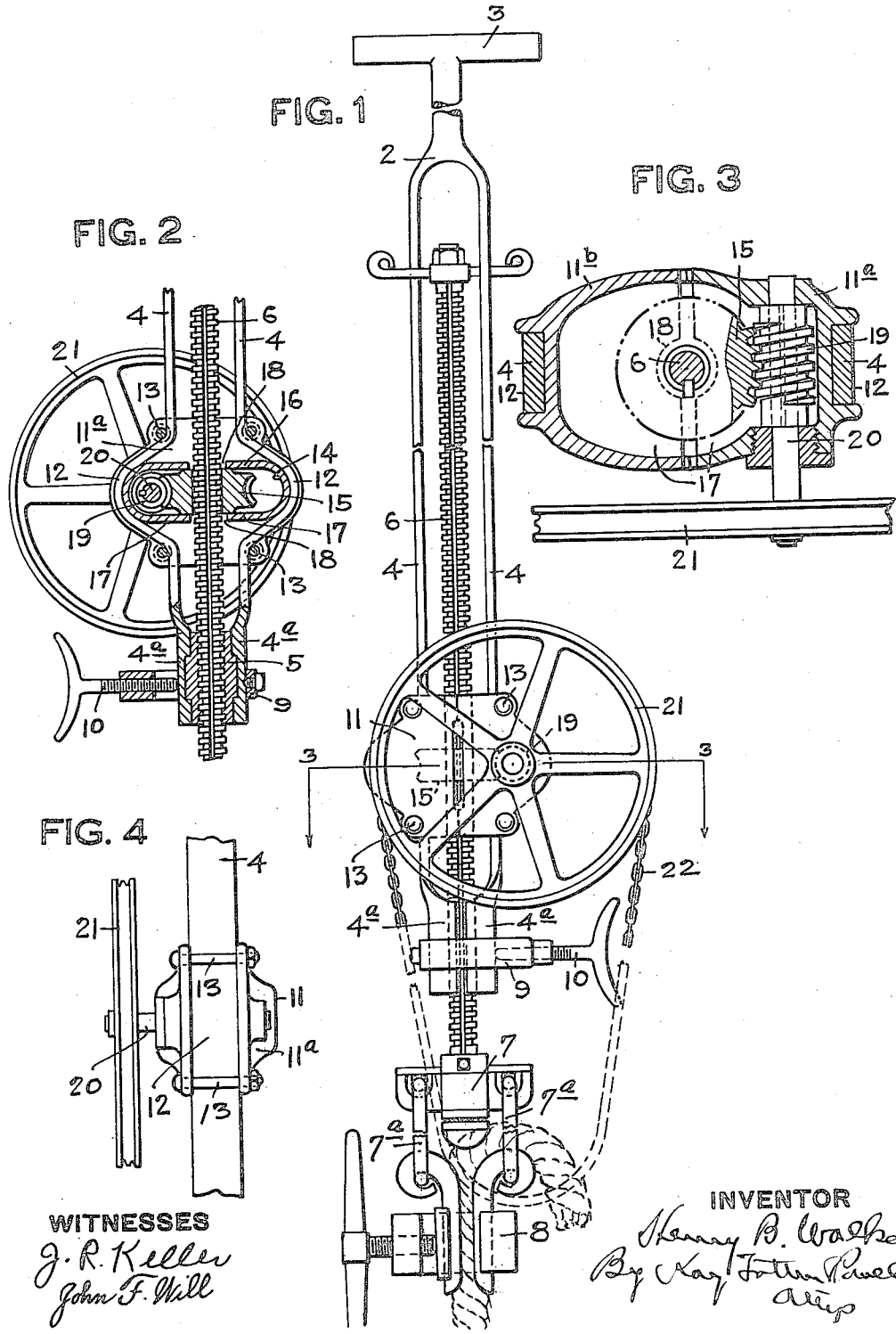

HENRY B. WALKER, OF LANCASTER, OHIO.

TEMPER-SCREW FOR WELL-DRILLING.

1,252,866.   Specification of Letters Patent.   Patented Jan. 8, 1918.

Application filed May 9, 1916. Serial No. 96,389.

*To all whom it may concern:*

Be it known that I, HENRY B. WALKER, a citizen of the United States, and resident of Lancaster, in the county of Fairfield and State of Ohio, have invented a new and useful Improvement in Temper-Screws for Well-Drilling; and I do hereby declare the following to be a full, clear, and exact description thereof.

My invention relates to improvements in temper-screws, and has particular reference to an improved feed and controlling mechanism for the screw.

Temper-screws as now employed in well-drilling operations consist in part of a frame made in the form of a long link and having at its upper end a T-head for attachment to the walking beam; the lower end of the sides of the frame terminating in jaws adapted to receive a split nut through which the screw passes, the screw being provided at its lower end with a swivel to which the clamp for the cable is attached.

In drilling operations, the screw is advanced or lowered through its nut in the frame by turning a cross-arm or handle attached to the screw. These screws are of great length, being as much as seven feet long; and in order to provide for the full length of feed of the screw, a corresponding or greater length of cable must be above the well-head, the rope clamps and swivel attached to the screw, increasing the length so that when in its uppermost position, the operating handle or cross-arm by which the screw is fed is at such height from the operating floor that the driller must stand on a raised platform.

In the art of drilling, much depends on the manner in which the temper screw is handled. Proper tension of the screw to permit of uniform feed is essential to efficient drilling. These adjustments are made by hand, while the screw is reciprocating, the screw carrying the entire weight of the string of tools, and great skill is required of the operator to make these adjustments and prevent "running away" or "spinning out" of the screw; and not infrequently this happens resulting in breaking the screw and possibly a "fishing" job, and often with injury to the operator by being struck with the rapidly revolving cross-arm.

In the accompanying drawings, Figure 1 is an elevational view of my improved mechanism as applied to a temper screw; Fig. 2 is a vertical section through the feed mechanism; Fig. 3 is an enlarged horizontal section taken on the line 3—3, Fig. 1; and Fig. 4 is an elevational side view of the gear box and feed mechanism.

The frame of the temper screw is indicated by the numeral 2, provided with a T-head 3 for attachment to the walking-beam, and reins 4 which terminate in jaws 4ª forming a box for the split nut 5, through which the screw 6 is fed. The screw is provided with the swivel 7 connected by links 7ª to a suitable rope or cable clamp 8. The lower end of the frame is equipped with the usual clamping yoke 9 and tension screw 10. The function of this clamp is to bind the screw to the frame in case of repairs to the feed mechanism while the tools are suspended from the screw, and in place of the split nut, a solid nut may be used, and other means employed to support the screw when disengaged from the feed mechanism.

Mounted between the reins of the frame above the screw nut is the gear-feed housing 11, this housing is formed in two half sections 11ª and 11ᵇ. The reins are spread apart as at 12 and are adapted to fit outside the end walls and between the flanged side walls of the sections and secured thereto by bolts 13. These sections are arranged to abut together when clamped between the reins of the frame, and form a box or bearing 14 for the feed mechanism. This mechanism comprises a worm gear 15 splined to the screw 6 and adapted to rotate therewith, the screw being free to move longitudinally through the bore of the wheel, the top and bottom walls 16 and 17 of the sections having the central openings 18 through which the screw passes, the walls forming thrust bearings for the worm-wheel. This worm-wheel is driven by a worm 19 mounted on a shaft 20 journaled in the section 11ª, the shaft projects from the housing and has mounted thereon the sheave-wheel 21. Rotation is imparted to the sheave by means of a chain 22.

In operating the device, the feed-gearing is actuated either by the operator pulling on the chain to rotate the sheave or, simply by holding the chain in a fixed position while the frame supporting the sheave is reciprocating by the walking beam.

It will be seen by the above description that rotation of the sheave imparts rotary motion to the worm-wheel, which, in turn, by reason of its keyed connection to the screw, will rotate the screw and feed it through its nut in the lower end of the frame.

The worm-wheel engaging the worm acts as a positive lock to prevent the screw from "spinning out."

What I claim is:

In a temper-screw, the combination of a suitable frame, reins carried thereby having outwardly-bent portions forming a housing support, housings carried by said bent portions, a partable nut carried by said reins, a feed-screw engaging said nut member, a worm-wheel splined on said feed-screw in said housings, a worm in said housings engaging said worm-wheel, and means for turning said worm by the upward movement of said frame.

In testimony whereof I, the said HENRY B. WALKER, have hereunto set my hand.

HENRY B. WALKER.

Witnesses:
JOHN F. WILL,
J. R. KELLER.